(12) United States Patent
Sugai

(10) Patent No.: US 7,353,986 B2
(45) Date of Patent: Apr. 8, 2008

(54) ELECTRONIC PEDOMETER

(75) Inventor: Yoshinori Sugai, Chiba (JP)

(73) Assignee: Seiko Instruments Inc. (JP)

( * ) Notice: Subject to any disclaimer, the term of this patent is extended or adjusted under 35 U.S.C. 154(b) by 361 days.

(21) Appl. No.: 11/076,296

(22) Filed: Mar. 9, 2005

(65) Prior Publication Data

US 2005/0205656 A1    Sep. 22, 2005

(30) Foreign Application Priority Data

Mar. 18, 2004    (JP)    ............... 2004-077614

(51) Int. Cl.
G01C 22/00    (2006.01)
(52) U.S. Cl. .................... 235/105; 235/95 R; 702/159; 702/160
(58) Field of Classification Search ................ 235/105, 235/95 R; 702/159, 160
See application file for complete search history.

(56) References Cited

U.S. PATENT DOCUMENTS 4,510,704 A    4/1985    Johnson ........................ 36/136

5,117,444 A *    5/1992    Sutton et al. ............... 377/24.2
6,254,513 B1 *    7/2001    Takenaka et al. ............... 482/3

FOREIGN PATENT DOCUMENTS

| JP | 04242031 | 8/1992 |
| JP | 09223214 | 8/1997 |
| JP | 01143048 | 5/2001 |
| JP | 03344095 | 12/2003 |
| WO | 98004683 | 1/1998 |
| WO | 00033031 | 12/2001 |

* cited by examiner

Primary Examiner—Karl D. Frech
(74) Attorney, Agent, or Firm—Adams & Wilks

(57)    ABSTRACT

An electronic pedometer has a walk detecting sensor to detect a walking movement of a user and to output a walk signal corresponding to the walking movement. A walk judging circuit judges, based on a walk signal from the walk detecting circuit, whether or not the user is walking. A control circuit switches an operation of the walk detecting circuit from a continuous operation to an intermittent operation when the walk judging circuit judges that the user stops walking. During a continuous operation, the walk detecting circuit continuously detects a walk of the user, while during an intermittent operation the walk detecting circuit intermittently detects the walk of the user within a predetermined cycle.

20 Claims, 8 Drawing Sheets

ELECTRONIC PEDOMETER

BACKGROUND OF THE INVENTION

1. Field of the Invention

The present invention relates to an electronic pedometer for measuring the number of steps taken, by detecting walking of a human being or the like.

2. Description of the Prior Art

Heretofore, there has been developed an electronic pedometer for measuring the number of steps taken of a user by detecting walking of the user using a walk sensor.

In an electronic pedometer, for example, an acceleration sensor is used as a walk sensor. There are known an electronic pedometer using a system (direct carrying system) in which at least the acceleration sensor is directly worn in a body of a user such as the wrist or an arm to be carried with the user, an electronic pedometer using a system (indirect carrying system) in which at least the acceleration sensor is held in a pocket of a user's clothing, or a bag or the like of the user to be carried by the user, and the like (refer to Patent Documents 1 and 2, for example).

In particular, in the electronic pedometer using the indirect carrying system, there is no telling when a signal on the number of steps taken will be detected in many cases. Hence, a power supply usually supplies an electric power to an amplification circuit for amplifying a signal from the acceleration sensor to cause the amplification, whereby the amplification circuit is usually in an operation state. For example, not only when a user is sleeping, but when the acceleration sensor is left being held in a bag or the like, the amplification circuit is kept in the operation state, leading to a problem in that the electronic pedometer consumes much electric power. In addition, since the electronic pedometer is of a portable type, a battery is used as a power supply. Hence, there is encountered a problem in that a battery life is shortened and thus a battery must be frequently exchanged for a new one since the electronic pedometer consumes much electric power. Also, when the battery is a secondary battery, a problem occurs in that the secondary battery must be frequently charged with electricity.

In addition, in the case as well of the electronic pedometer using the direct carrying system, such as a watch type electronic pedometer, there is a problem in that when an electric power is continued to be supplied to the amplification circuit in a state in which the electronic pedometer is placed in a predetermined position during sleep, a rest or the like, electric power is wastefully consumed.

For a method of solving the above problems, as in a pedometer described in Patent Document 2, there is a conceivable method of changing a sampling frequency in correspondence to detection and non-detection of walk vibration. However, this method involves a problem in that when the sampling frequency is low, measurement precision is degraded.

<Patent Document 1> JP 09-223214 A

<Patent Document 2> JP 2001-143048 A

The present invention has been made in order to solve the above problems, and it is, therefore, an object of the present invention to provide an electronic pedometer which is capable of lengthening a battery life by saving power consumption without degrading measurement precision. It is another object of the present invention to provide an electronic pedometer which is capable of reducing the number of times of battery exchange or battery charge by lengthening a battery life without degrading measurement precision to save labor required for the battery exchange or battery charge.

SUMMARY OF THE INVENTION

According to the present invention, there is provided an electronic pedometer having walk detecting means for detecting a walk of a user to output a walk signal corresponding to the walk, calculation means for calculating the number of steps taken of the user based on the walk signal, and a battery for supplying an electric power to each of constituent elements, including; walk judging means for judging based on a signal from the walk detecting means whether or not the user is walking; and control means for, when the walk judging means judges that the user stops to walk, changing an operation of the walk detecting means from a continuous operation for continuously detecting a walk over to an intermittent operation for repeating the operation and stop with a predetermined cycle.

The walk judging means judges based on a signal from the walk detecting means whether or not the user is walking. When the walk judging means judges that the user stops to walk, the control means changes an operation of the walk detecting means from a continuous operation for continuously detecting a walk over to an intermittent operation for repeating operation and stop (standstill) with a predetermined cycle.

Here, when the walk judging means judges that the user stops to walk, the control means may set a first intermittent operation in which an operation is carried out with a first cycle for a first time period, and after a lapse of the first time period, set a second intermittent operation in which an operation is carried out with a second cycle longer than the first cycle.

Then, the electronic pedometer may further include: timing means for counting time; and storage means for storing therein data on a day of a week and data on a start time of the second intermittent operation so as for the start time to have one-to-one correspondence to the day of the week, in which after a day of a week and a time counted by the timing means become equal to the day of the week the data on which is stored in the storage means and the timing, having one-to-one correspondence to the day of the week, the data on which is also stored in the storage means, respectively, the control means sets the first time period to a second time period shorter than the first time period, and when the walk judging means judges that the user stops to walk, carries out the first intermittent operation for the second time period, and after a lapse of the second time period, sets the second intermittent operation.

Then, the electronic pedometer may further include: timing means for counting time; and storage means for storing therein data on a start time of the second intermittent operation, in which after a time counted by the timing means become equal to the time the data on which is stored in the storage means, the control means sets the first time period to a third time period shorter than the first time period, and when the walk judging means judges that the user stops to walk, carries out the first intermittent operation for the third time period, and after a lapse of the third time period, sets the second intermittent operation.

Then, the electronic pedometer may further include a posture detecting sensor for detecting a posture of the electronic pedometer, in which when an output signal from the posture detecting sensor does not change for a predetermined time period, the control means stops the operation of the walk detecting means until the output signal from the posture detecting sensor changes.

Further, the control means may change supply of an electric power from the battery to the walk detecting means from continuous supply over to intermittent supply, to change an operation of the walk detecting means from a continuous operation over to an intermittent operation.

Further, the walk detecting means may include a walk sensor for detecting a walk of the user, and an amplification circuit for amplifying a signal from the walk sensor to output the amplified signal, and the control means may change supply of the electric power from the battery to the amplification circuit from the continuous supply over to the intermittent supply, to change an operation of the walk detecting means from the continuous operation over to the intermittent operation.

Further, when the walk judging means judges that the user restarts the walk, the control means may return the operation of the walk detecting means from the intermittent operation back to the continuous operation.

Then, the electronic pedometer may further include wear detecting means for detecting whether or not the electronic pedometer is worn in a body, in which while the wear detecting means judges that the electronic pedometer is not worn in the body, the control means may stop the operation of the walk detecting means.

Moreover, the electronic pedometer may further include: manipulation means for setting an operation stop time period for which the operation of the walk detecting means is stopped; and storage means for storing therein data on the operation stop time period set by the manipulation means, in which the control means stops the operation of the walk detecting means for the operation stop time period.

BRIEF DESCRIPTION OF THE DRAWINGS

A preferred form of the present invention is illustrated in the accompanying drawings in which.

DETAILED DESCRIPTION OF THE PREFERRED EMBODIMENTS

Embodiments of the present invention will hereinafter be described with reference to the accompanying drawings.

Figure 1:
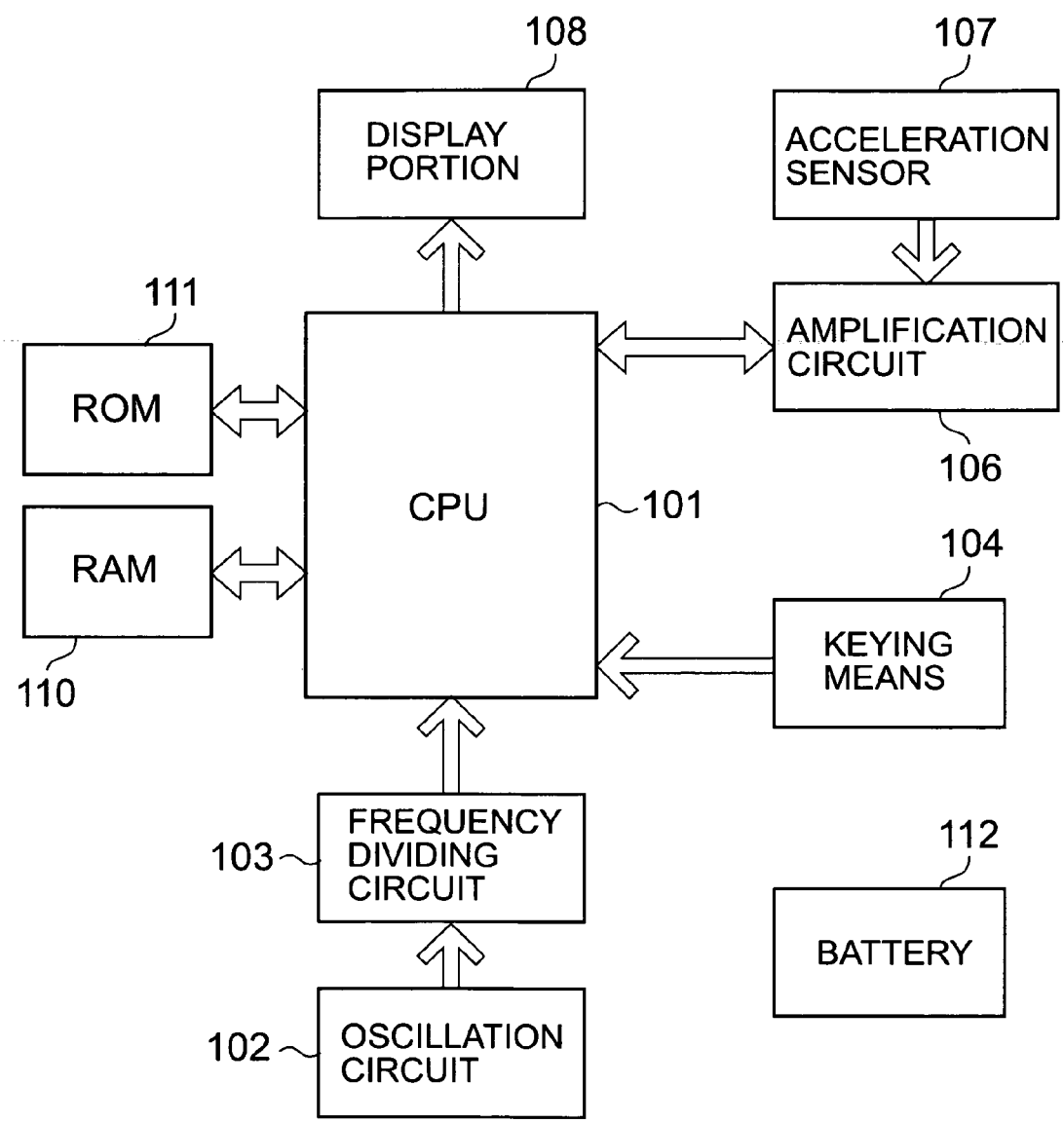
FIG. 1 is a block diagram of an electronic pedometer according to a first embodiment of the present invention.

FIG. 1 is a block diagram of an electronic pedometer according to a first embodiment of the present invention.

In FIG. 1, the electronic pedometer includes: a central processing unit (CPU) 101; an oscillation circuit 102 for outputting a signal having a predetermined frequency; a frequency dividing circuit 103 for frequency-dividing the output signal from the oscillation circuit 102 at a predetermined frequency driving rate to output a reference signal for timing; keying means 104, as manipulation means, constituted by a switch which can be manipulated from the outside; an acceleration sensor 107 as a walk sensor for detecting a walk (including running) of a user to output a signal (walk signal) corresponding to the walk; an amplification circuit 106 for amplifying the signal from the acceleration sensor 107; a display portion 108 as display means for displaying thereon data on the number of steps taken or the like; a random access memory (RAM) 110 for storing therein the measured data on the number of steps taken, a set value and the like; a read only memory (ROM) 111 for previously storing therein a program to be executed by the CPU 101; and a battery 112 as a power supply for supplying an electric power to each of electronic circuit constituent elements, of the electronic pedometer, such as the amplification circuit 106. Then, an external appearance of the electronic pedometer has a form of a watch.

Note that the CPU 101 constitutes calculation means, walk judging means, and control means. In addition, the CPU 101 constitutes, together with the oscillation circuit 102 and the frequency dividing circuit 103, timing means for counting time. Also, the amplification circuit 106 and the acceleration sensor 107 constitute walk detecting means, and the RAM 110 and the ROM 111 constitute storage means.

FIGS. 2 to 5 are flow charts each showing processings in the electronic pedometer according to the first embodiment of the present invention. Those processings are executed by executing the program previously stored in the ROM 111 by the CPU 101. Hereinafter, an operation of the electronic pedometer according to the first embodiment of the present invention will be described with reference to FIGS. 1 to 5.

First of all, a user wears the electronic pedometer in his/her arm in a manner similarly to arm wear of a watch and starts to walk.

In response to a manipulation by the keying means 104 for starting measurement of the number of steps taken, the CPU 101 causes the battery to supply an electric power to each of the electronic circuit constituent elements of the electronic pedometer such as the amplification circuit 106 to cause the amplification circuit 106 to continuously operate and to cause each of the electronic circuit constituent elements to operate (Step 21). As a result, the acceleration sensor 107 detects a walk of a user to output a signal (walk signal) corresponding to the walk to the amplification circuit 106. The amplification circuit 106 amplifies the walk signal from the acceleration sensor 107 to output the resultant signal in the form of a walk signal to the CPU 101.

The CPU 101 judges whether or not the walk signal has been inputted from the amplification circuit 106 (Step 22). When the CPU 101 judges in Step 22 that the walk signal has been inputted from the amplification circuit 106, the CPU 101 executes a processing for measuring the number of steps taken in Step 213, and the operation is then returned back to the processing in Step 22. In the processing for measuring the number of steps taken in Step 213, the CPU 101 calculates the number of steps taken of the user based on the walk signal which has been inputted from the acceleration sensor 107 through the amplification circuit 106 and instructs the display portion 108 to display thereon data on the accumulated number of steps taken. Here, the CPU 101 constitutes calculation means.

When the CPU 101 judges in Step 22 that the walk signal is not yet inputted from the amplification circuit 106, the CPU 101 times the signal from the frequency dividing circuit 103 and judges whether or not a first dormancy transference time period data on which was stored in the RAM 110 has elapsed (Step 23). When the CPU 101 judges in Step 23 that the first dormancy transference time does not yet elapse, the operation is returned back to the processing in Step 22. Note that the elapsed time period in Step 23 is counted after no walk signal was outputted from the amplification circuit 106. In this embodiment, 5 minutes are set as the first dormancy transference time period. Here, the CPU 101 functions as timing means.

On the other hand, when the CPU 101 judges in Step 23 that the first dormancy transference time period has already elapsed, the CPU 101 stops the supply of the electric power from the battery 112 to the amplification circuit 106 to turn OFF the amplification circuit 106 (Step 24). At and after this time point, the operation enters a first dormancy state, and also enters a second dormancy transference time period as a first time period. In the first dormancy state, the CPU 101 carries out the control so that the amplification circuit 106 carries out an intermittent operation (first intermittent operation) at intervals of the first dormancy time period (e.g., 20 seconds) as a first time cycle. Note that normally, a plurality of first dormancy time periods are continued in the second dormancy transference time period.

In this state, the CPU 101 judges whether or not the first dormancy time period has already elapsed (Step 25). When the CPU 101 judges in Step 25 that the first dormancy time period has already elapsed, the CPU 101 causes the battery 112 to supply a drive electric power to the amplification circuit 106 to turn ON the amplification circuit 106 (Step 26). Here, the CPU 101 functions as the timing means.

Next, the CPU 101 verifies whether or not the walk signal has already been outputted from the amplification circuit 106 (Step 27). When the CPU 101 verifies in Step 27 that the walk signal has already been outputted from the amplification circuit 106, the operation proceeds to the processing in Step 213 where the CPU 101 executes the processing for measuring the number of steps taken, and the operation is then returned back to the processing in Step 22. When the CPU 101 verifies in Step 27 that the walk signal is not yet outputted from the amplification circuit 106, the CPU 101 judges whether or not a second dormancy transference time period (a predetermined time period just after the operation enters the first dormancy state) has already elapsed (step 28). Here, the CPU 101 functions as the timing means.

When the CPU 101 judges in Step 28 that the second dormancy transference time period does not yet elapse, the operation is returned back to the processing in Step 24. When the CPU 101 judges in Step 28 that the second dormancy transference time period has already elapsed, the CPU 101 stops the supply of the electric power from the battery 112 to the amplification circuit 106 to turn OFF the amplification circuit 106 (Step 29). At and after this time point, the operation enters a second dormancy state. In the second dormancy state, there is carried out a second intermittent operation for intermittently driving the amplification circuit 106 at intervals of a second dormancy time period (e.g., 1 minute) as a second cycle longer than the first dormancy time period.

In this state, the CPU 101 judges whether or not the second dormancy time period has already elapsed (Step 210). When the CPU 101 judges in Step 210 that the second dormancy time period has already elapsed, the CPU 101 causes the battery 112 to supply the drive electric power to the amplification circuit 106 to turn ON the amplification circuit 106 (Step 211). Here, the CPU 101 functions as the timing means.

Next, the CPU 101 verifies whether or not the walk signal has already been outputted from the amplification circuit 106 (Step 212). When the CPU 101 verifies in Step 212 that the walk signal has already been outputted from the amplification circuit 106, the operation proceeds to the processing in Step 213. In Step 213, the CPU 101 executes the processing for measuring the number of steps taken. The operation is then returned back to the processing in Step 22.

When the CPU 101 verifies in Step 212 that the walk signal is not yet outputted from the amplification circuit 106, the operation is returned back to the processing in Step 29. Then, the second dormancy state is continued.

Note that the processings in Steps 22, 27, and 212 executed by the CPU 101 constitute the walk judging means. In addition, the processings in Step 23 to 26, and 28 to 211 constitute the control means.

Figure 2:
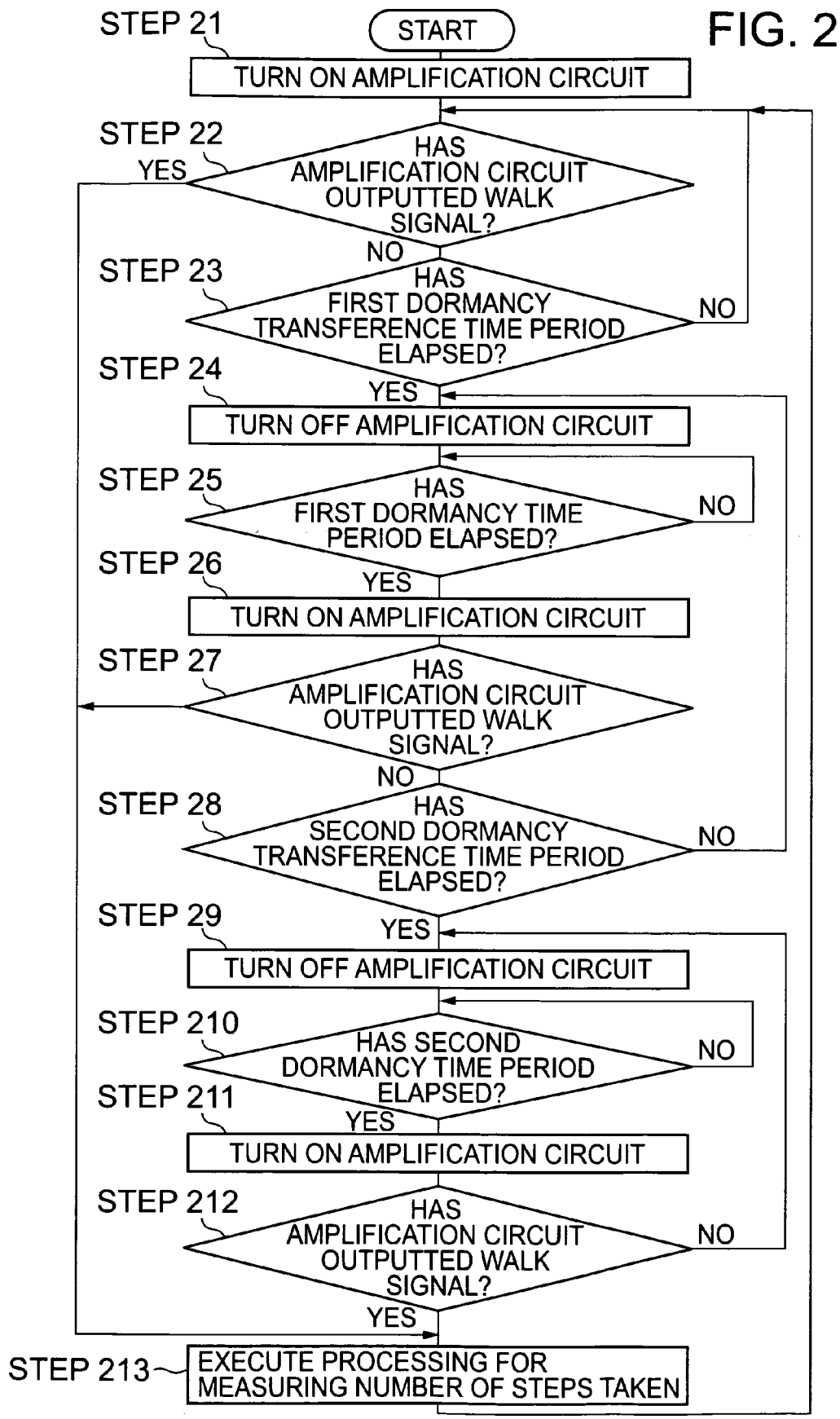
FIG. 2 is a flow chart showing processings in the electronic pedometer according to the first embodiment of the present invention.
Figure 3:
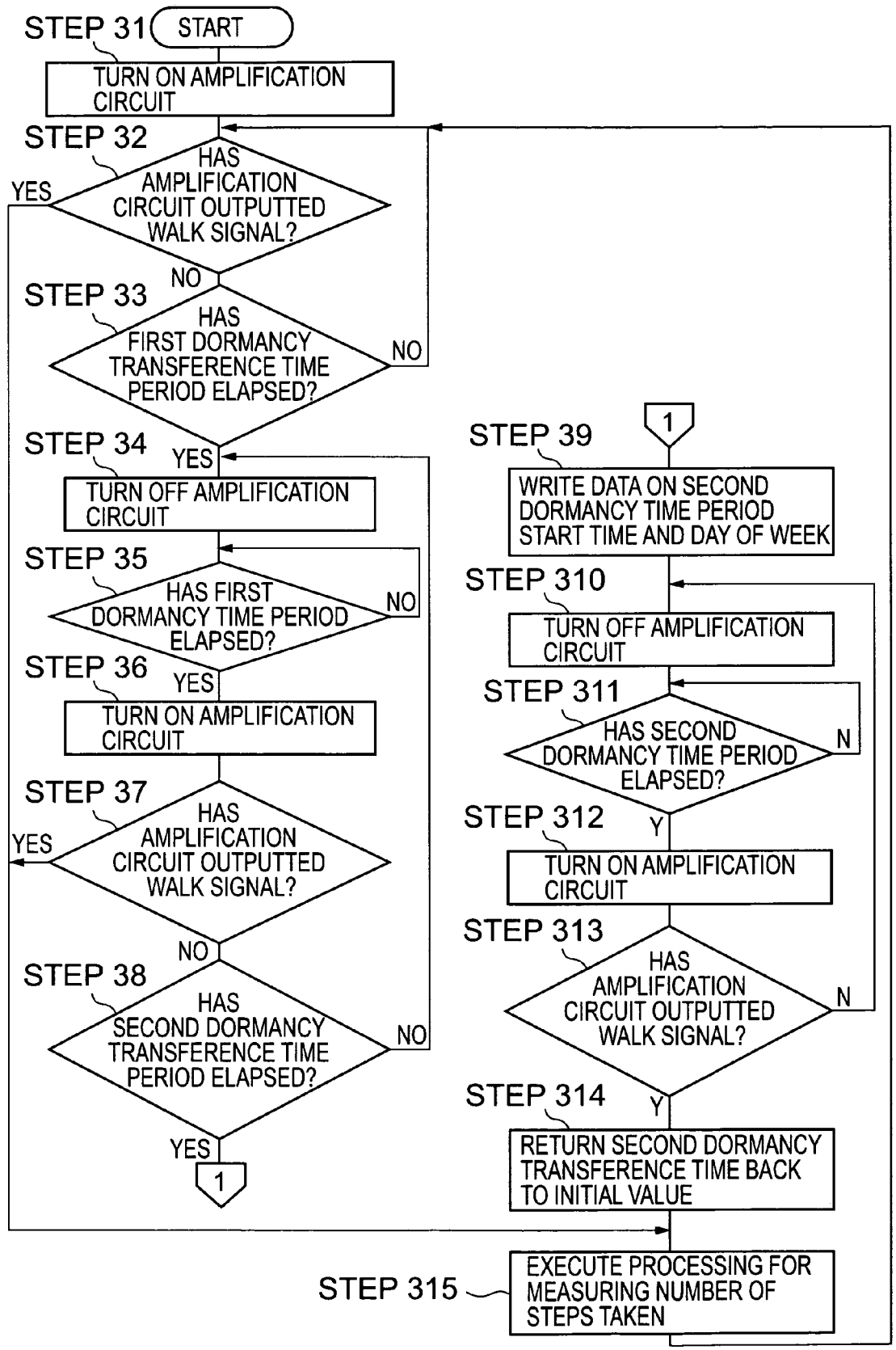
FIG. 3 is a flow chart showing processings in the electronic pedometer according to the first embodiment of the present invention.

FIG. 3 is a flow chart showing processings for storing data on a second dormancy time period start time of a day concerned and data on a day of the week in ROM 110 so as to show one-to-one correspondence between the second dormancy time period and the day of the week. Processings in FIG. 3 will hereinafter be described with reference to FIGS. 1 and 2. Note that since the processings in Steps 31 to 38 in FIG. 3 are the same as those in Steps 21 to 28 in FIG. 2, and the processings in Steps 310 to 313 and 315 in FIG. 3 are the same as those in Steps 29 to 213 in FIG. 2, their descriptions are omitted here for the sake of simplicity.

A point of difference of the processings in FIG. 3 from the processings in FIG. 2 is that data on a second dormancy time at which the operation enters a second dormancy state, and data on a day of the week are stored in the RAM 110 so as to show one-to-one correspondence between the second dormancy time and the day of the week, and a time of the next day is changed at which the operation enters the second dormancy state.

That is, in FIG. 3, by executing a processing in Step 39 added between the processing in Step 28 and the processing in Step 29 in FIG. 2, data on a day of the week on which the operation enters the second dormancy state, and data on a time having one-to-one correspondence to that day of the week are stored in the RAM 110. In addition, after the acceleration sensor 107 detects the walk of the user by executing a processing in Step 314 added between the processing in Step 212 and the processing in Step 213 in FIG. 2, the data on the second dormancy transference time is returned back to an initial value.

Figure 4:
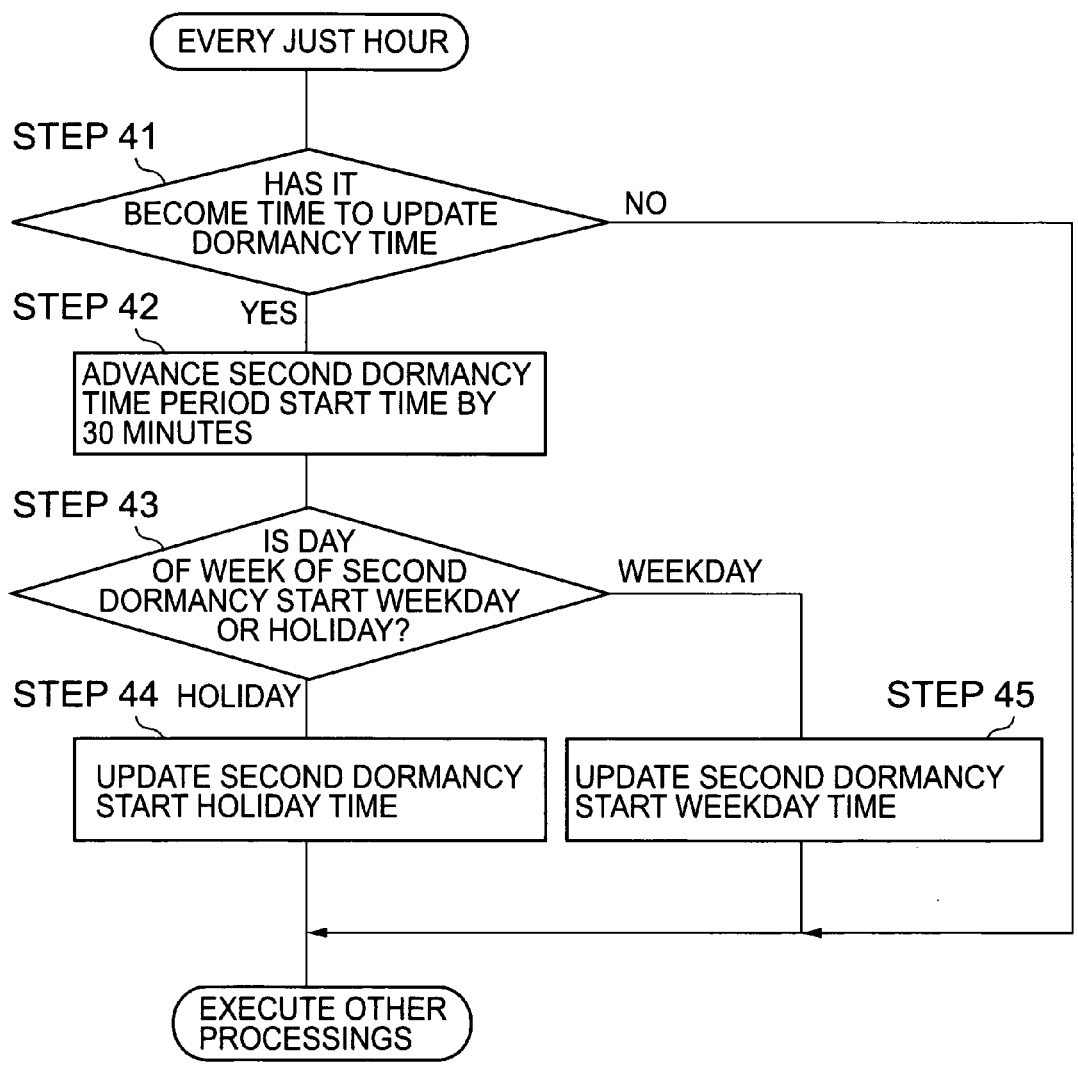
FIG. 4 is a flow chart showing processings in the electronic pedometer according to the first embodiment of the present invention.

FIG. 4 is a flow chart showing processings every right hour. The CPU 101 judges every right hour whether or not it has come time to update the dormancy time (Step 41). When the CPU 101 judges in Step 41 that it does not yet come time to update the dormancy time, the CPU 101 executes other processings. When the CPU 101 judges in Step 41 that it has come time to update the dormancy time, the CPU 101 advances the second dormancy time period start time the data on which was stored through the processing in Step 39 in FIG. 3 by 30 minutes for example (Step 42). Next, the CPU 101 judges whether a day of the week the data on which was stored through the processing in Step 39 is a weekday or a holiday (Step 43). When the CPU 101 judges in Step 43 that a day of the week is a holiday, the CPU 101 updates a second dormancy start holiday time (Step 44).

When the CPU 101 judges in Step 43 that a day of the week is a weekday, the CPU 101 updates a second dormancy start weekday time (Step 45).

Figure 5:
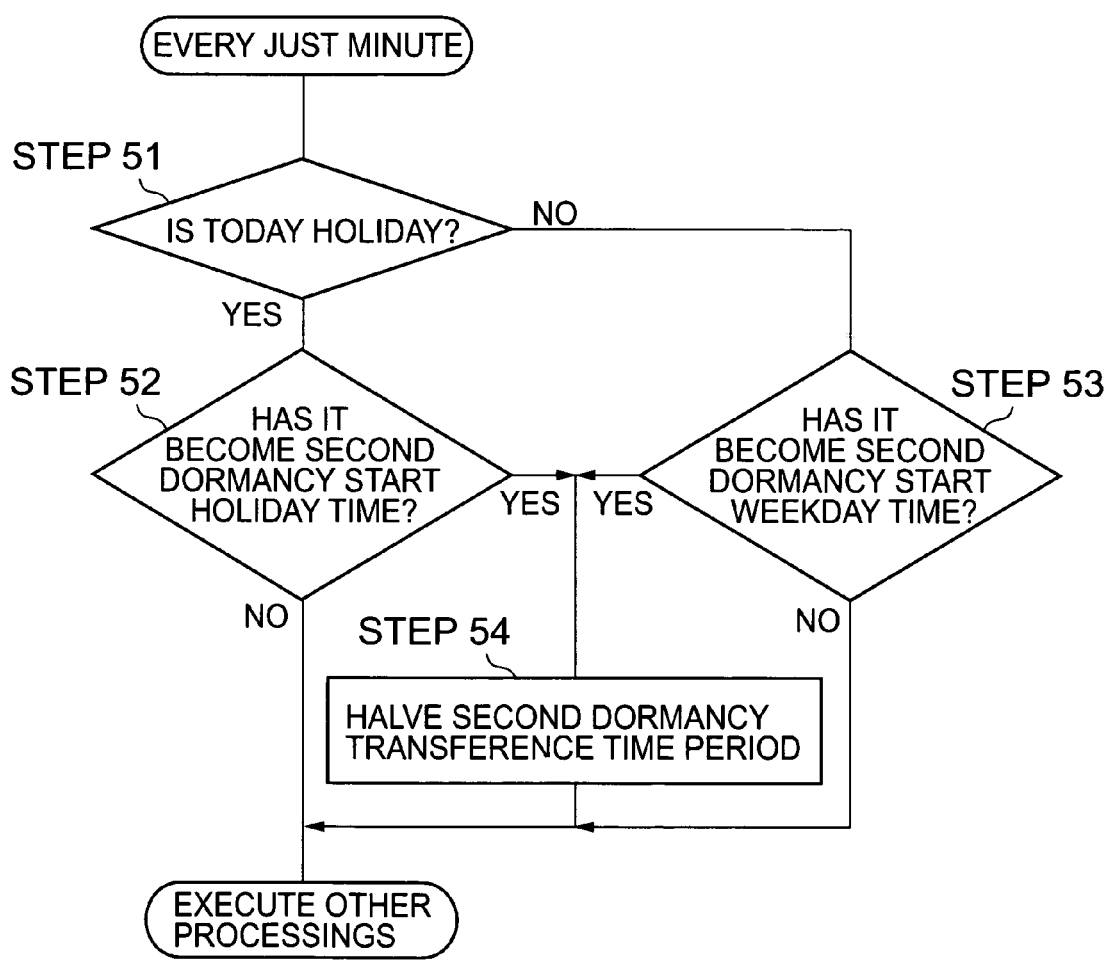
FIG. 5 is a flow chart showing processings in the electronic pedometer according to the first embodiment of the present invention.

FIG. 5 is a flow chart showing processings executed every right minute. In FIG. 5, the CPU 101 judges whether or not today is a holiday (Step 51). When the CPU 101 judges in Step 51 that today is a holiday, the CPU 101 judges whether or not it has become a second dormancy start holiday time for a holiday (Step 52). When the CPU 101 judges in Step 52 that it has become a second dormancy start holiday time for a holiday, the CPU 101, for example, halves a second dormancy transference time used in the comparison in Step 28 or in Step 38 (Step 54), and carries out the early detection related to whether or not the operation transfers to the second dormancy state.

When the CPU 101 judges in Step 51 that today is a weekday, the CPU 101 judges whether or not it has become a second dormancy start time having one-to-one correspondence to the weekday (Step 53). When the CPU 101 judges that it has become a second dormancy start time having one-to-one correspondence to the weekday, similarly, the CPU 101 sets a second dormancy transference time period to a second period which, for example, is half the second dormancy transference time period (Step 54), and carries out the early detection related to whether or not the operation enters a second dormancy state. When the CPU 101 judges that it does not yet become that time in both the holiday and the weekday, the CPU 101 executes other processings.

That is, the CPU 101 stored data on a day of the week, and data on a start time of the second intermittent operation having one-to-one correspondence to the day of the week in the RAM 110. Also, after the day of the week the data on which was stored in the RAM 110 and the time having one-to-one correspondence to the day of the week the data on which was also stored in the RAM 110 have come, the CPU 101 sets the second dormancy transference time period to the second time period shorter than the original the second dormancy transference time period. Hence, it is possible to advance a time at which the operation enters the second intermittent operation, and thus the more power saving becomes possible.

Note that, a day of the week, and a start time of the second intermittent operation having one-to-one correspondence to the day of the week are not necessarily used. That is, only data on a time at which the operation transfers to the second intermittent operation may be stored in the RAM 110, and the time at which the operation transfers to the second intermittent operation may be advanced by referring to that time the data on which is stored in the RAM 110.

That is, the data on the start time of the second intermittent operation was stored in the RAM 110 and after it becomes the time the data on which was stored in the RAM 110, the CPU 101 sets the second dormancy transference time period to a third time period shorter than the original second dormancy transference time period, whereby it is possible to advance the time at which the operation enters the second intermittent operation, and thus the more power saving becomes possible. Note that the second time period and the third time period may have the same time period.

Figure 6:
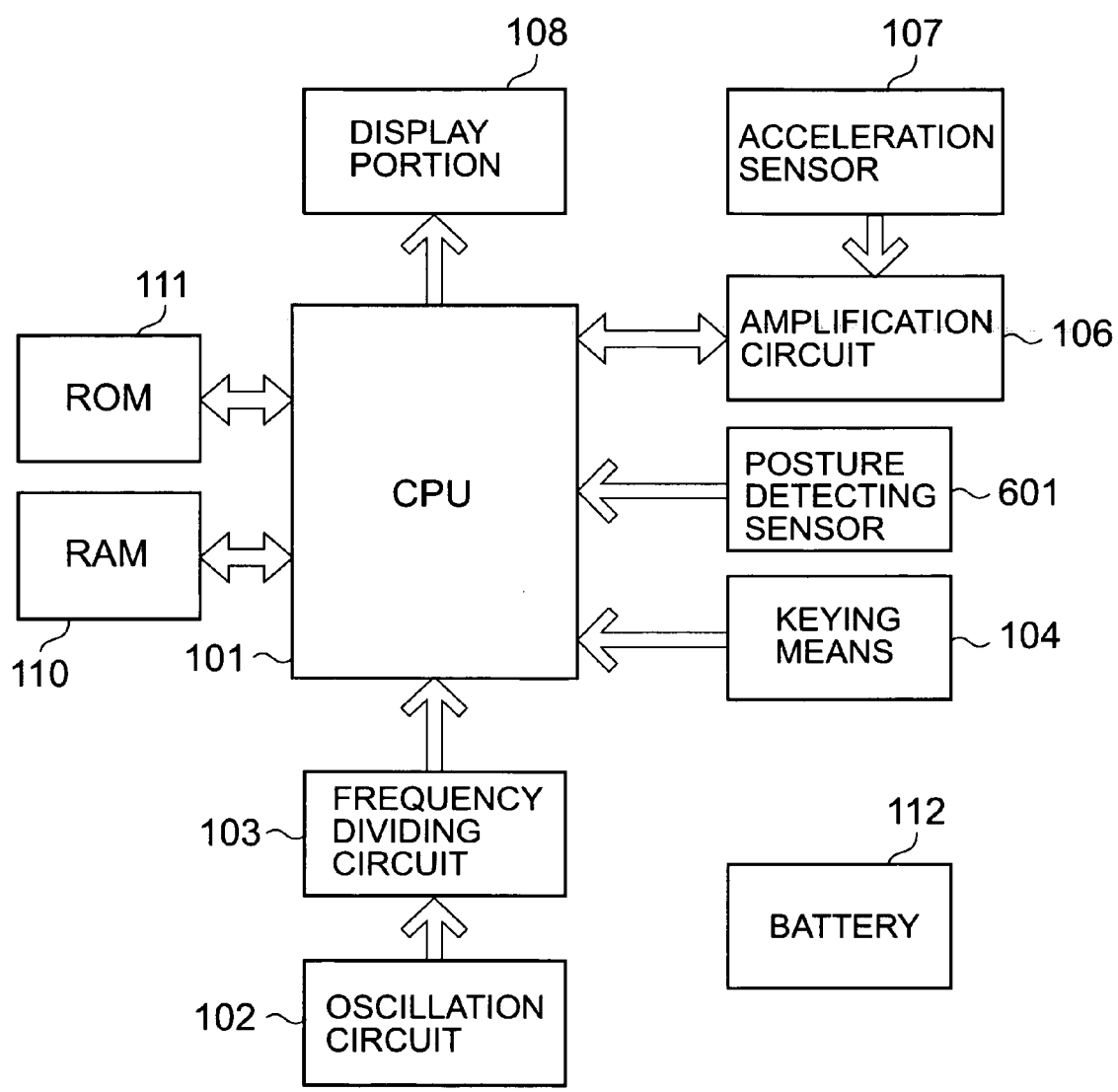
FIG. 6 is a block diagram of an electronic pedometer according to a second embodiment of the present invention.

FIG. 6 is a block diagram of an electronic pedometer according to a second embodiment of the present invention, and the same constituent elements as those in the first embodiment shown in FIG. 1 are designated with the same reference numerals. The electronic pedometer according to the second embodiment includes a posture detecting sensor 601 in addition to the constituent elements of the electronic pedometer according to the first embodiment.

Figure 7:
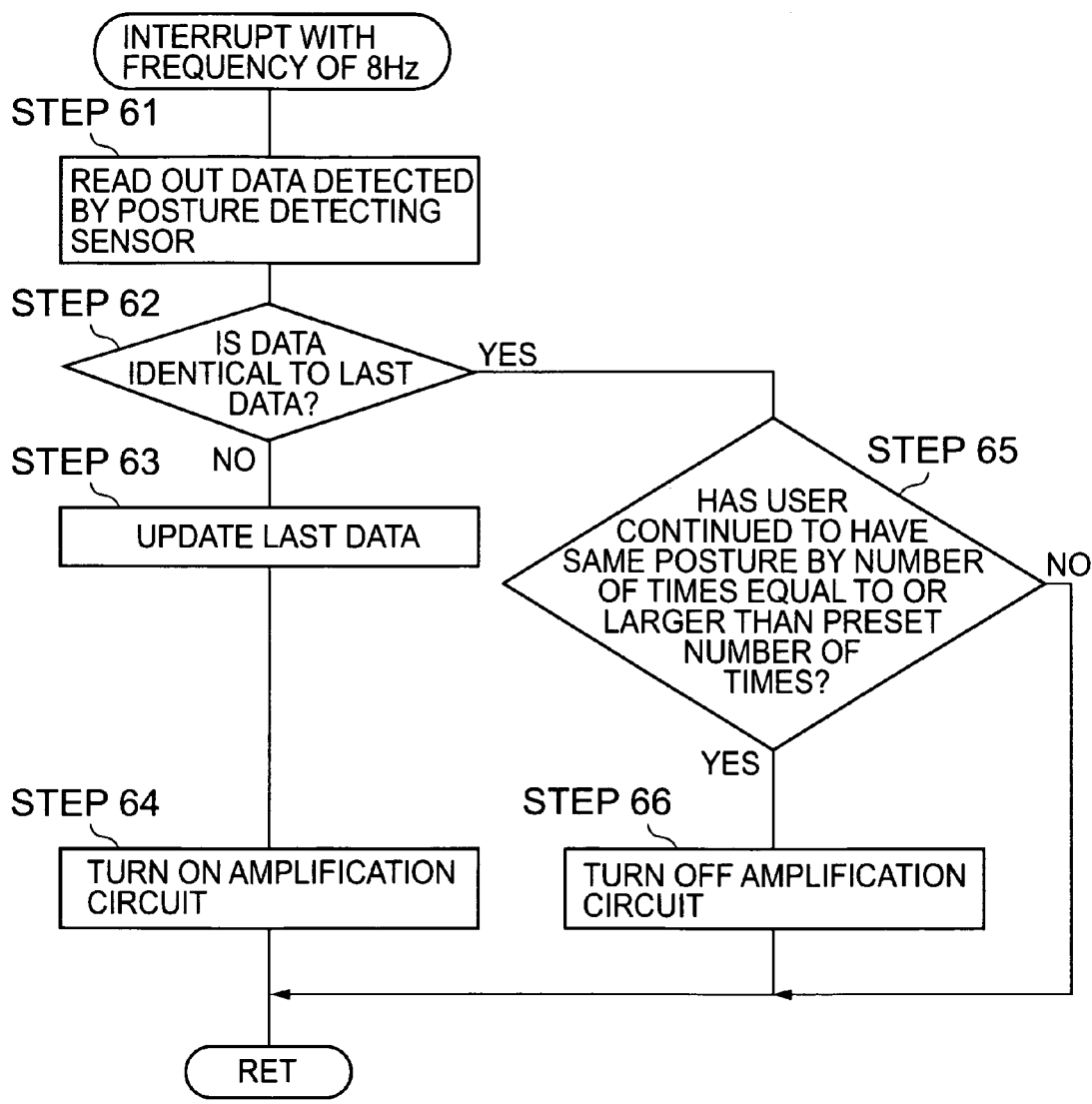
FIG. 7 is a flow chart showing processings in the electronic pedometer according to the second embodiment of the present invention.

FIG. 7 is a flow chart showing processings in the electronic pedometer according to the second embodiment, i.e., a flow chart showing processings when the operation state of the amplification circuit 106 is changed over to the turn-ON or to the turn-OFF state in accordance with the judgment related to whether or not a change in posture of the electronic pedometer is detected by the posture detecting sensor 601.

For example, the CPU 101 periodically verifies a state of the posture detecting sensor 601 using an interrupt having a frequency of 8 Hz. In Step 61, the CPU 101 reads out a data signal detected by the posture detecting signal 601 every lapse of the interrupt having the frequency of 8 Hz. The CPU 101 judges whether or not the data signal from the posture detecting sensor 601 is the same as the last data signal (Step 62). When the CPU 101 judges in Step 62 that the data signal from the posture detecting sensor 601 is not the same as the last data signal, the CPU 101 judges that the posture of a user changed, and updates the last (newest) data (Step 63). Thereafter, since the posture of the user changed, in order to start the measurement, the CPU 101 causes the battery 112 to supply the electric power to the amplification circuit 106 to turn ON the amplification circuit 106 (Step 64).

When the CPU 101 judges in Step 62 that the data signal from the posture detecting sensor 601 is the same as the last data signal, the CPU 101 verifies whether or not the user has continued to have the same posture by the number of times equal to or larger than the preset number of times (for an equal to or larger than a predetermined time period) (Step 65). When the CPU 101 judges in Step 65 that the user has continued to have the same posture for an equal to or larger than the predetermined time period, the CPU 101 stops the supply of the electronic power from the battery 112 to the amplification circuit 106 to turn OFF the amplification circuit 106, thereby saving the electricity (Step 68). When the CPU 101 judges in Step 65 that the user has not continued to have the same posture by the number of times equal to or larger than the preset number of times, the CPU 101 completes the operation.

Figure 8:
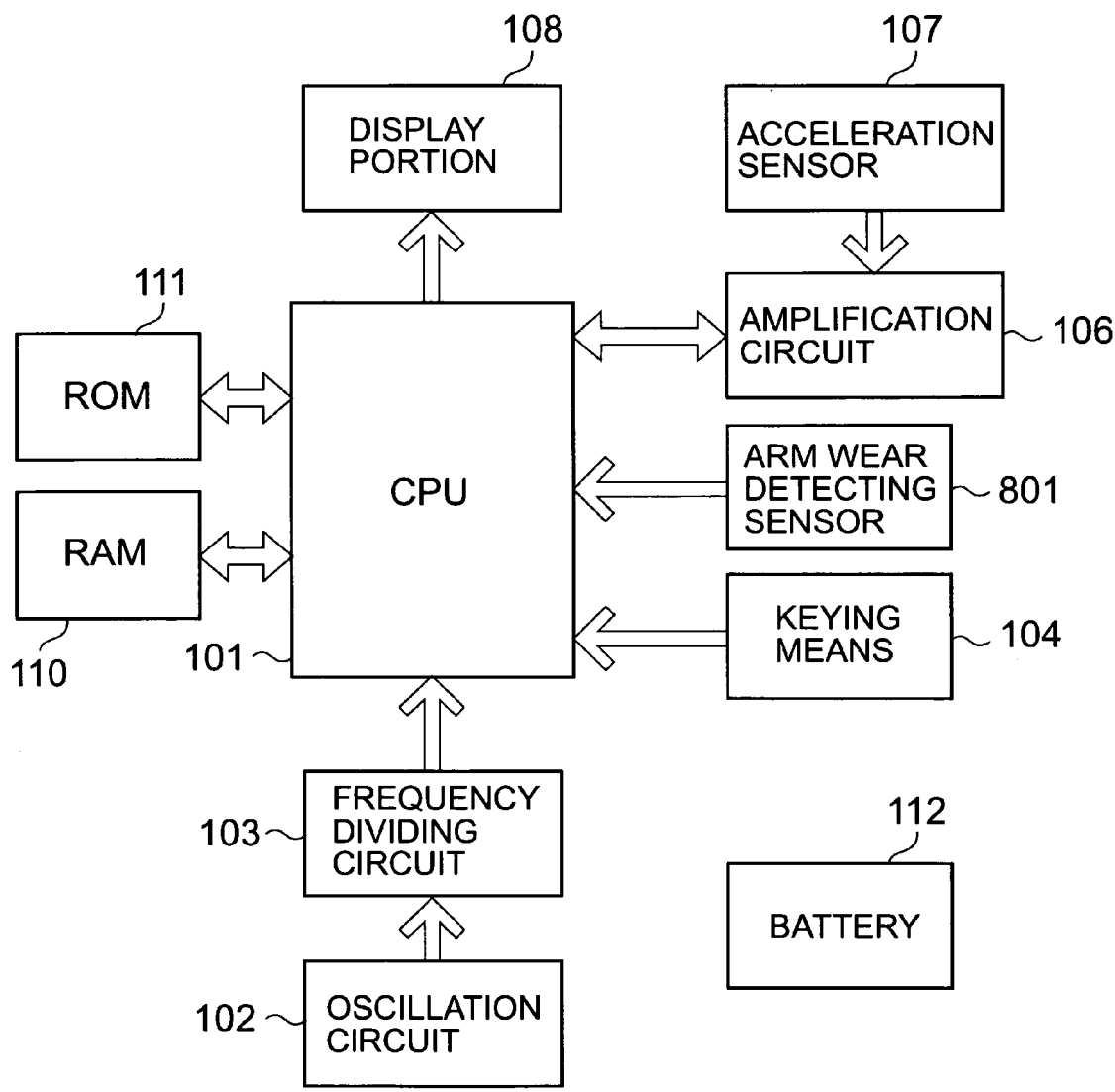
FIG. 8 is a block diagram of an electronic pedometer according to a third embodiment of the present invention.

FIG. 8 is a block diagram of an electronic pedometer according to a third embodiment of the present invention, and the same constituent elements as those of the first embodiment shown in FIG. 1 are designated with the same reference numerals. The electronic pedometer according to the third embodiment includes an arm wear detecting sensor 801 as wear detecting means in addition to the constituent elements of the electronic pedometer of the first embodiment. For example, two electrodes constituting the arm wear detecting sensor 801 are provided so as to slightly project from a back cover of a watch type electronic pedometer. When a resistance value obtained between the two electrodes decreases, the CPU 101 judges that the electronic pedometer is worn in arm of a user.

While the electronic pedometer is worn in the arm of the user, the CPU 101 causes the battery 112 to continuously supply an electronic power to the amplification circuit 106 to continuously operate the amplification circuit 106. On the other hand, while the electronic pedometer is not worn in the arm of the user, the CPU 101 stops the supply of the electric power from the battery 112 to the amplification circuit 106 to turn OFF the amplification circuit 106. Thus, the electric power is prevented from being unnecessarily consumed. While the CPU 101 stops the supply of the electric power from the battery 112 to the amplification circuit 106 to turn OFF the amplification circuit 106, the CPU instructs the display portion 108 to display thereon the effect that the operation for measuring the number of steps taken is in the course of being stopped.

Note that, as another aspect, the following configuration may also be adopted. Data on a time period for which the amplification circuit 106 operates, e.g., data on an operation stop time of the amplification circuit 106 and data on an operation start time of the amplification circuit 106, or data on an operation start time of the amplification circuit 106 and data on an operation time period of the amplification circuit 106, or data on an operation start time of the amplification circuit 106 and data on an operation time period of the amplification circuit 106 are stored from the keying means 104 in the RAM 110. While a current time is within the time period the data on which is stored in the RAM 110, the CPU 101 drives the amplification circuit 106 so that the amplification circuit 106 operates, and during other time periods, the CPU 101 stops the operation of the amplification circuit 106. In this case as well, similarly to the third embodiment, while the CPU 101 stops the supply of the electric power from the battery 112 to the amplification circuit 106 to stop the operation for measuring the number of steps taken, the CPU 101 instructs the display portion 108 to display thereon the effect that the operation for measuring the number of steps taken is being stopped.

In addition, while in the above first to third embodiments, the acceleration sensor is used as the walk sensor, a pressure sensor or the like provided in the sole of a shoe may also be used as the walk sensor.

The present invention can also be applied to an electronic pedometer which is configured such that all constituent elements of the pedometer are worn in a user in order to use the pedometer, or an electronic pedometer which is configured such that a part (including at least sensors) of constituent elements is worn in a user, and other constituent elements transmit/receive signals in a wireless manner to/from the part of the constituent elements, the other constituent elements being provided in a place distant from the user. In addition, the present invention can also be applied to an electronic pedometer in which the walk sensor is worn in a part of the body other than an arm, or an electronic pedometer which is held in a bag or the like carried by a user, thereby being indirectly carried by the user.

According to the present invention, it becomes possible to lengthen a battery life by saving power consumption without degrading measurement precision. In addition, it becomes possible to reduce the number of times of battery exchange or battery charge by lengthening a battery life without degrading measurement precision to save labor required for the battery exchange or battery charge.

What is claimed is:

1. An electronic pedometer having walk detecting means for detecting a walk of a user and outputting a walk signal corresponding to the walk, calculation means for calculating a number of steps of the user in accordance with the walk signal, and a battery for supplying an electric power to the walk detecting means and the calculation means, the electronic pedometer comprising:
   walk judging means for judging based on a walk signal from the walk detecting means whether or not the user is walking; and
   control means for, when the walk judging means judges that the user stops walking, switching an operation of the walk detecting means from a continuous operation for continuously detecting a walk of the user over to an intermittent operation for intermittently detecting a walk of the user within a predetermined cycle.

2. An electronic pedometer according to claim 1; wherein when the walk judging means judges that the user stops walking, the control means sets a first intermittent operation of the walk detecting means in which an operation is carried out with a first cycle for a first time period, and after a lapse of the first time period, the control means sets a second intermittent operation of the walk detecting means in which an operation is carried out with a second cycle longer than the first cycle.

3. An electronic pedometer according to claim 2; further comprising: timing means for counting time; and storage means for storing therein data on a day of a week and data on a start time of the second intermittent operation so that the start time is in one-to-one correspondence with the day of the week; wherein after a day of a week and a time counted by the timing means become equal to the day of the week and the start time, respectively, stored in the storage means, the control means sets the first time period to a second time period shorter than the first time period; and wherein when the walk judging means judges that the user stops walking, the control means carries out the first intermittent operation for the second time period, and after a lapse of the second time period, the control means sets the second intermittent operation.

4. An electronic pedometer according to claim 2; further comprising timing means for counting time; and storage means for storing therein data on a start time of the second intermittent operation; wherein after a time counted by the timing means become equal to the time stored in the storage means, the control means sets the first time period to a third time period shorter than the first time period; and when the walk judging means judges that the user stops to walk, the control means carries out the first intermittent operation for the third time period, and after a lapse of the third time period, the control means sets the second intermittent operation.

5. An electronic pedometer according to claim 1; further comprising a posture detecting sensor for detecting a posture of the electronic pedometer; wherein when an output signal from the posture detecting sensor does not change for a predetermined time period, the control means stops the operation of the walk detecting means until the output signal from the posture detecting sensor changes.

6. An electronic pedometer according to claim 1; wherein the control means switches a supply of an electric power from the battery to the walk detecting means from continuous supply over to intermittent supply to switch an operation of the walk detecting means from the continuous operation over to the intermittent operation.

7. An electronic pedometer according to claim claim 6; wherein the walk detecting means comprises a walk sensor for detecting a walk of the user, and an amplification circuit for amplifying a signal from the walk sensor and outputting the amplified signal; wherein the control means switches a supply of the electric power from the battery to the amplification circuit from the continuous supply over to the intermittent supply to switch the operation of the walk detecting means from the continuous operation over to the intermittent operation.

8. An electronic pedometer according to claim 1; wherein when the walk judging means judges that the user restarts walking, the control means returns the operation of the walk detecting means from the intermittent operation back to the continuous operation.

9. An electronic pedometer according to claim 1; further comprising wear detecting means for detecting whether or not the electronic pedometer is worn on the body of the user;

wherein while the wear detecting means judges that the electronic pedometer is not worn on the body of the user, the control means stops the operation of the walk detecting means.

10. An electronic pedometer according to claim 1; further comprising manipulation means for setting an operation stop time period for which the operation of the walk detecting means is stopped; and storage means for storing therein data on the operation stop time period set by the manipulation means; wherein the control means stops the operation of the walk detecting means for the operation stop time period.

11. An electronic pedometer, comprising:
a walk judging circuit to judge based on a signal from a walk detecting circuit whether or not a user is walking; and
a control circuit to, when the walk judging circuit judges that the user stops walking, switch an operation of the walk detecting circuit from a continuous operation for continuously detecting a walk of the user over to an intermittent operation for intermittently detecting a walk of the user within a predetermined cycle.

12. An electronic pedometer comprising:
a walk sensor to detect a walking movement of a user and to output a walk signal corresponding to the walking movement;
an amplification circuit to amplify the walk signal from the walk sensor and to output a corresponding amplified walk signal;
a walk judging circuit to judge in accordance with an amplified walking signal from the amplification circuit whether or not the user is walking; and
a control circuit to switch an operation of the amplification circuit from a continuous operation, in which the walking movement of the user is detected continuously, over to an intermittent operation, in which the walking movement of the user is detected intermittently, in accordance with whether the walk judging circuit judges that the user is walking or not, respectively.

13. An electronic pedometer according to claim 12; wherein the walk judging circuit judges that the user is walking when the control circuit inputs an amplified walk signal from the amplification circuit and judges that the user is not walking when the control circuit has not inputted an amplified walk signal from the amplification circuit for a preselected period of time.

14. An electronic pedometer according to claim 13; wherein the control circuit switches the operation of the amplification circuit to the intermittent operation when the preselected period of time has elapsed.

15. An electronic pedometer according to claim 12; wherein when the walk judging circuit judges that the user stops walking, the control circuit sets a first intermittent operation of the amplification circuit in which an operation is carried out with a first cycle for a first time period, and after a lapse of the first time period, the control circuit sets a second intermittent operation of the amplification circuit in which an operation is carried out with a second cycle longer than the first cycle.

16. An electronic pedometer according to claim 15; further comprising a timing circuit to count time and a storage device to store data on a day of a week and data on a start time of the second intermittent operation so that the start time is in one-to-one correspondence with the day of the week; wherein after a day of a week and a time counted by the timing circuit become equal to the day of the week and the start time, respectively, stored in the storage device, the control circuit sets the first time period to a second time period shorter than the first time period; and wherein when the walk judging circuit judges that the user stops walking, the control circuit carries out the first intermittent operation for the second time period, and after a lapse of the second time period, the control circuit sets the second intermittent operation.

17. An electronic pedometer according to claim 12; further comprising a posture detecting sensor to detect a posture of the electronic pedometer; wherein when an output signal from the posture detecting sensor does not change for a predetermined time period, the control circuit stops the operation of the amplification circuit until the output signal from the posture detecting sensor changes.

18. An electronic pedometer according to claim 12; further comprising a battery for supplying electric power to the amplification circuit; wherein the control circuit switches the operation of the amplifying circuit from the continuous operation to the intermittent operation by switching a supply of electric power from the battery to the amplifying circuit from continuous supply over to intermittent supply, respectively.

19. An electronic pedometer according to claim 12; wherein when the walk judging circuit judges that the user restarts walking, the control circuit switches the operation of the amplifying circuit from the intermittent operation back to the continuous operation.

20. An electronic pedometer according to claim 12; further comprising a wear detecting device to detect whether or not the electronic pedometer is worn on the body of the user; wherein while the wear detecting device judges that the electronic pedometer is not worn on the body of the user, the control circuit stops the operation of the amplifying circuit.

* * * * *